Aug. 12, 1947.    H. A. WHEELER    2,425,585
WAVE-SIGNAL ANTENNA
Filed Dec. 13, 1943    5 Sheets-Sheet 1

INVENTOR
HAROLD A. WHEELER
BY Harry B. Page.
ATTORNEY

Aug. 12, 1947.  H. A. WHEELER  2,425,585
WAVE-SIGNAL ANTENNA
Filed Dec. 13, 1943  5 Sheets-Sheet 2

INVENTOR
HAROLD A. WHEELER
BY
ATTORNEY

Aug. 12, 1947.    H. A. WHEELER    2,425,585
WAVE-SIGNAL ANTENNA
Filed Dec. 13, 1943    5 Sheets-Sheet 3

INVENTOR
HAROLD A. WHEELER
BY *Harry L. Page*
ATTORNEY

Aug. 12, 1947.     H. A. WHEELER     2,425,585
WAVE-SIGNAL ANTENNA
Filed Dec. 13, 1943     5 Sheets-Sheet 5

INVENTOR
HAROLD A. WHEELER
BY
ATTORNEY

Patented Aug. 12, 1947

2,425,585

UNITED STATES PATENT OFFICE 2,425,585

WAVE-SIGNAL ANTENNA

Harold A. Wheeler, Great Neck, N. Y., assignor, by mesne assignments, to Hazeltine Research, Inc., Chicago, Ill., a corporation of Illinois Application December 13, 1943, Serial No. 514,072

23 Claims. (Cl. 250—33)

1

The present invention relates to wave-signal antennas and particularly to such antennas adapted to be supported for operation with one end adjacent to the end of an exposed conductor which is elevated in open space above the ground.

The intensity of a wave signal propagated from one antenna to another depends upon numerous factors. In general, it is desirable that both antennas be positioned at the greatest practicable height above the ground to ensure that maximum wave-signal energy shall be propagated from one of the antennas to the other. For wave signals of such high frequency that the height of the antenna is of the order of several wave lengths, the ground is then so far below the antenna that metal conductors in between may give rise to undesirable conditions in the operation of the antenna. Thus, where the antenna is supported on a conductive mast or is connected by a shielded transmission line to wave-signal apparatus on the ground, the mast or transmission line is in open space and has distributed series inductance and shunt capacitance to ground. As a result, it acts as an open transmission line or wave guide having resonant properties and wave-signal radiation characteristics. This is undesirable not only from the standpoint that some wave-signal energy may be absorbed from the antenna by resonance, but also in the view that a substantial portion of such energy may be radiated into space and thus impair the directive characteristic desired of the antenna.

It has heretofore been proposed that these undesirable effects be avoided by positioning between the antenna and its conductive supporting mast, or between the antenna and its associated transmission line, a relatively large sheet of conductive material to shield the mast or line from wave-signal energy translated by the antenna. A shield of this nature must have a size of the order of one-half wave length of the translated wave signal if adequate shielding is to be attained and preferably should be as large as one wave length. Where the antenna is located out-of-doors, this has the disadvantage that it introduces the difficult mechanical problem of providing sufficient support for the shielding plate to enable it to withstand severe icing and sleeting conditions, vibration and high winds. There is the additional disadvantage that the large physical size required for effective shielding may prohibit the use of this type of shield in many applications.

It has also been proposed that an antenna be provided with a wave-signal shield formed by a

2 system of conductors positioned between the antenna and its mast or transmission line and arranged as an electrically unitary planar structure with the conductors extending radially as spokes from a common center. Usually four such conductors, arranged at right angles to each other, are considered sufficient and the effective electrical length of each conductor is specified as one-quarter wave length of the signal to be translated by the antenna. While this form of wave-signal shield avoids in large part the mechanical problems associated with the support of a wave shield of the type first mentioned, it does not have as effective wave-signal shielding properties as does the latter. This ineffectiveness as a shield holds even when more than four shielding spokes are employed. There is an additional disadvantage of this form of wave-signal shield for some applications in that its physical size is materially larger than desired and is prohibitive in some cases.

It is an object of the present invention, therefore, to provide, in a system for translating wave signals within a predetermined relatively narrow range of wave lengths, a new and improved antenna which avoids one or more of the disadvantages and limitations of prior antennas of this nature.

It is an additional object of the invention to provide, in a system for translating wave signals within a predetermined relatively narrow range of wave lengths, an improved antenna of the type wherein an antenna member is supported at the end of an exposed conductor and in which the effect of such conductor on one or more of the operating characteristics desired of the antenna is greatly reduced.

It is a further object of the invention to provide, in a system for translating wave signals within a predetermined relatively narrow range of wave lengths, an antenna adapted to have its radiation resistance easily and readily fixed by design or adjustment to any desired value within a relatively wide range of such values.

It is an additional object of the invention to provide, in a system for translating wave signals within a predetermined relatively narrow range of wave lengths, a new and improved antenna which is adapted to have a substantially uniform impedance over such range.

It is a further object of the invention to provide, in a system for translating wave signals within a predetermined relatively narrow range of wave lengths, a new and improved antenna which is adapted to be constructed as a unitary structure having an effective wave-signal shield of small physical dimensions and of relatively light weight.

It is yet another object of the invention to provide a wave-signal shield having maximum effectiveness by virtue of its resonant properties and one which has minimum weight, is of relatively open construction, and has relatively small overall dimensions.

In accordance with the invention there is provided, in a system for translating wave signals within a predetermined relatively narrow range of wave lengths, an antenna comprising an antenna conductor supported for operation at the end of a nearby exposed conductor and extending therefrom, whereby the nearby conductor may undesirably guide energy away from the antenna conductor. The antenna includes a unitary electrically conductive structure positioned in the adjacent space between the aforementioned conductors and conductively connected with the exposed conductor, the structure including a plurality of conductive members each extending radially from the antenna conductor and each having an effective electrical length of an odd number of quarter wave lengths plus an incremental length at a predetermined wave length in the aforesaid range. The incremental lengths of the members have such values as to provide substantially optimum cancellation of the inductive coupling between the aforesaid conductors within the aforesaid predetermined range, thereby to provide an antenna having a resonant wave-signal shield which substantially reduces the undesirable guiding of energy by the nearby conductor away from the antenna conductor within the aforesaid predetermined range.

In accordance with a particular form of the invention, a resonant wave-signal shield, for substantially terminating the propagation between two exposed conductors of wave signals having any wave length within a predetermined relatively narrow range of wave lengths, comprises a unitary electrically conductive structure having means for supporting the structure in the adjacent space between the aforesaid conductors in conductive connection with one thereof and including a plurality of conductive members each extending radially from the other of the aforesaid conductors and each having an effective electrical length of an odd number of quarter wave lengths plus an incremental length at a predetermined wave length in the aforesaid range. The incremental lengths of the conductive members have such values as to provide substantially optimum cancellation of the inductive coupling between the aforesaid conductors within the aforesaid predetermined range.

For a better understanding of the present invention, together with other and further objects thereof, reference is had to the following description taken in connection with the accompanying drawings, and its scope will be pointed out in the appended claims.

Referring now to the drawings.

Figure 1:
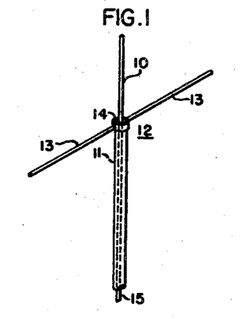
Fig. 1 illustrates a wave-signal antenna embodying the present invention in a particular form.

Referring now more particularly to Fig. 1, there is illustrated an antenna embodying the present invention in a particular form and one suitable for use in a system for translating wave signals within a predetermined relatively narrow range of wave lengths. The term "Relatively narrow" range of wavelengths as used in the present specification and claims is intended to mean one which is very small with relation to the mean wave length of the range, yet one which is very wide with respect to the pass band of any single wave-signal transmitter or receiver and may be comparable with the tuning range of such transmitter or receiver where the tuning range involved is small as compared with its mean wave length. The antenna comprises a linear antenna conductor 10 which may have an effective electrical length of one-quarter wave length and which is adapted to be supported for operation at the end of a nearby exposed colinear conductor 11 and extending therefrom, whereby the nearby conductor 11 may undesirably guide energy away from the antenna conductor 10. The antenna includes a unitary electrically conductive structure 12 positioned in the adjacent space between the antenna conductor 10 and the exposed conductor 11 and conductively connected to the latter. The structure 12 includes a plurality of conductive shield members or rods 13 each extending radially from the antenna conductor 10 at a predetermined angle relative thereto and each having an effective electrical length of an odd number of quarter wave lengths plus an incremental length at the operating wave length of the antenna or at a predetermined wave length in the range over which the antenna is to operate. In the latter case, preferably the lengths of the shield members are related to the mean wave length of the range.

By the term "radial" as used herein is meant that the shield members 13 lie approximately in individual radial planes each of which includes the antenna conductor axis, but not necessarily that the shield members are themselves normal to such axis. The structure 12 includes means for supporting it in position in the adjacent space between the antenna conductor 10 and the exposed conductor 11, this means comprising a conductive collar 14 to which the shield members 13 are secured in conductive relationship therewith. The collar 14 may be slipped over the end of the open conductor 11 and secured in position thereon by any suitable means.

As will presently be explained in greater detail, the incremental lengths of the shield members 13 have such values as to provide substantial cancellation of the inductive coupling between the antenna conductor 10 and the exposed conductor 11 within the operating wave length range of the antenna. In particular, the incremental lengths of these members does not exceed one-eighth wave length at the mean wave length of such range. There is thus provided an antenna having a resonant wave-signal shield which substantially reduces the undesirable guiding of wave-signal energy by the exposed conductor 11 away from the antenna conductor 10 within the aforementioned predetermined range of operating wave lengths.

The exposed conductor 11 in practice may take the form of a rigid mast, for example a hollow pipe, upon which the antenna conductor 10 and the structure 12 are supported for operation, the antenna conductor being insulated from the former by any suitable means. In such case, the antenna conductor 10 is coupled through a concentric transmission line 15 in conventional manner to suitable wave-signal translating apparatus, not shown. As is well understood, however, the transmission line 15 may be replaced simply by a conductor connected to the antenna conductor 10 and extending axially through the exposed conductor 11 to form therewith a coaxial transmission line. Further, the antenna conductor 10 and the structure 12 may be supported upon a nonconductive mast and the exposed conductor 11 might then be simply the conductive shield of a flexible transmission line.

Figure 2A:
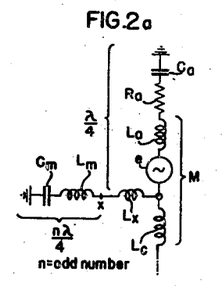
Figs. 2a to 2e represent the equivalent circuit diagram of a complete wave-signal antenna, and selected portions thereof, embodying the invention and is used as an aid in explaining the operation thereof.

Considering now the operation of the antenna just described, the equivalent schematic circuit of the antenna is shown in Fig. 2a where the distributed series inductance, distributed shunt capacitance and the radiation resistance of the antenna conductor 10 are represented by the respective lumped-impedance elements $L_a$, $C_a$, and $R_a$. The distributed series inductance and distributed shunt capacitance of the series-resonant portion, or odd number of quarter-wave length portions, of the conductive members 13 considered in parallel are represented in Fig. 2a by the lumped-impedance elements $L_m$ and $C_m$, respectively, while the distributed series inductance of the portion of these members comprising the incremental lengths thereof is represented by the lumped inductor $L_x$. The distributed series inductance of that portion of the exposed conductor 11 adjacent to the antenna conductor 10 is represented by the lumped inductor $L_c$. Assuming that the antenna is to operate as a radiator, wave signals are transmitted through the transmission line 15 and effectively applied between the base of the antenna conductor 10 and the structure 12. The source of such wave signals is represented in Fig. 2a by the generator $e$. It will be understood, of course, that if the antenna be used to receive radiated wave signals, the distributed voltages induced in the antenna are of such nature that the antenna may itself be considered a generator of wave-signal voltages, the equivalent circuit diagram being the same in either case.

Figure 2B:
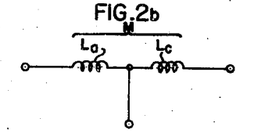

The lower portion of the antenna conductor 10 and the upper portion of the exposed conductor 11 have mutual inductive coupling M, as indicated in Fig. 2a, so that wave-signal currents flowing in the antenna conductor induce wave-signal voltages in the exposed conductor unless prevented as in an antenna embodying the present invention. It might be pointed out in passing that any such induced voltages cause the exposed conductor 11 to act as an open wave guide and thus undesirably to conduct wave-signal energy away from the antenna conductor. The manner in which the unitary electrically conductive structure 12 provides a resonant wave-signal shield which substantially reduces such undesirable loss of energy will now be explained by reference to Figs. 2b–2d, inclusive. In Fig. 2b, the equivalent lumped inductances of the antenna conductor and exposed conductor, having mutual inductance M, are shown arranged as a three-terminal network. This network may readily be changed to that of Fig. 2c by a standard impedance transformation. In the latter network, circuit 1 is coupled to circuit 2 by the inductance $-M$.

Figure 2C:
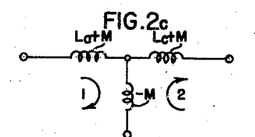
Figure 2D:
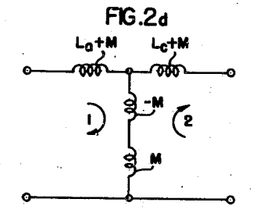
Figure 2E:
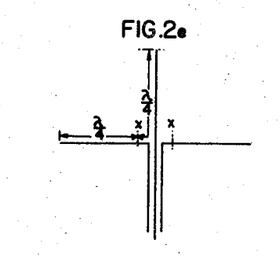

The mutual coupling $-M$ between circuits 1 and 2 of Fig. 2c may be cancelled by including in series with the inductance $-M$, and in common to circuits 1 and 2, a positive inductance M as shown in Fig. 2d. This figure represents a four-terminal network and is the equivalent network formed by the inductors $L_a$, $L_c$ and $L_x$ of Fig. 2a if the point $x$ of the latter figure has low impedance to space. This is accomplished in accordance with the present invention by making the inductor $L_m$ and the capacitor $C_m$ have series resonance at the operating wave length of the antenna or at some wave length within the range of wave lengths over which the antenna is to operate, as by making the portions of conductive members 13 which have the equivalent inductance $L_m$ and capacitance $C_m$ an odd number of quarter-wave lengths long. The incremental lengths of these members are so selected that they have in parallel a value of inductance $L_x$ just equal to the mutual inductance $-M$ which exists between the antenna conductor 10 and the exposed conductor 11. The mutual inductance $-M$ is thus effectively neutralized or cancelled and wave-signal currents flowing in the antenna conductor 10 do not induce wave-signal voltages in the exposed conductor 11. The incremental lengths of the conductive members 13 are resonated as a part of the antenna conductor 10 as indicated in Fig. 2e.

In adjusting or designing an antenna embodying the invention, therefore, the lengths of the conductive members 13 are first adjusted to provide maximum attenuation to wave-signal energy propagation from the antenna conductor 10 to the open conductor 11, and the length of the antenna conductor 10 is then adjusted for resonance at the mean wave length of the range of operating wave lengths.

Figure 3:
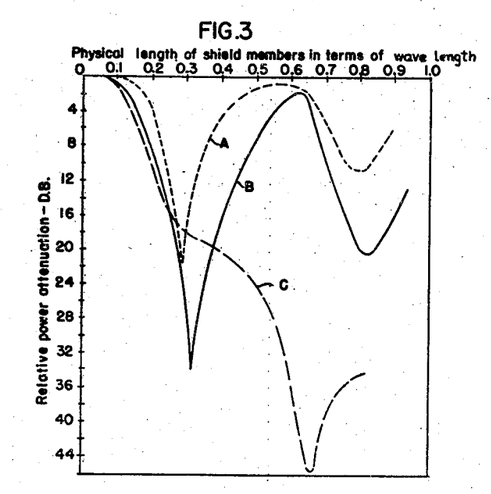
Fig. 3 is a graph representing the wave-signal attenuation provided by the resonant wave-signal shield structure of the antenna with variation of the effective electrical length and number of radial conductive members thereof.

Fig. 3 is a graph representing the manner in which the attenuation of wave-signal propagation from the antenna conductor 10 to the exposed conductor 11 varies with the lengths of the conductive members 13 and with the number of such members employed. Curve A represents the attenuation effected by two shield members arranged as shown in Fig. 1 and curve B the attenuation using four shield members arranged normal to the antenna conductor 10 and normal to each other. For purposes of comparison, curve C represents the attenuation of the prior art type of conductive disc positioned with the plane of the disc normal to the axis of the antenna conductor 10. It will be noted from curve A that the incremental lengths of the shield members 13 should be of the order of four-hundredths of a wave length whether the resonant length of each is one-quarter or three-quarters wave length. Where four shield members are used, the fact that the incremental lengths of the shield members operate effectively in parallel in their space relationship, as previously mentioned, necessitates that the incremental length of each shield member be extended to six-hundredths of a wave length and, as shown by curve B, this is true whether the resonant length of the shield members is one-quarter or three-quarters wave length.

It is generally desirable that the shield members be as short as possible so that, in practice, these members usually have a resonant length of one-quarter wave length. For this condition, it will be noted from curve A of Fig. 3 that the attenuation provided by two shield members is always greater than that provided by a solid shield disc over approximately a ten per cent. wave length range and that it compares favorably with the shield disc at the end regions of a twenty per cent. range. On the other hand, four shield members provide larger attenuation than a shield disc over an entire twenty per cent. wave length range, as shown by curve B of Fig. 3. The curves of Fig. 3 are scaled curves plotted from test data.

The exact value of the incremental lengths of the shield members for any given number and cross-sectional dimensions thereof cannot easily be computed mathematically. This value may easily be ascertained by measurement, however, by the use of the equipment illustrated in Fig. 4. This equipment is described and claimed in a copending application of Harold A. Wheeler, Serial No. 514,071, filed concurrently herewith, entitled Wave-guide system, and assigned to the same assignee as the present application. This equipment comprises a rigid hollow conductor 16 enclosing a coaxial conductor 17 to provide a coaxial transmission line which is coupled to a wave-signal generator, not shown. A disc 18 is supported at the end of the conductor 16 with its plane normal to the axis of the latter. The center of the disc is connected through a resistor 19 to the conductor 17 and aligned points on the disc equally spaced from its center are connected through resistors 20 and 21 to the conductor 16. If desired, the transmission line comprising the conductors 16 and 17 may be terminated in its image impedance by one or more resistors, not shown, inserted inside and at the end of the transmission line. A second conductive disc 22, which may be one-half wave length in diameter, is positioned on the conductor 16 preferably several wave lengths distant from the disc 18. The disc 22 has an aperture 23 which is slightly larger than the diameter of the conductor 16. The aperture 23 is closed by a coaxial cavity resonator one-quarter wave length long comprising a conductive cylinder 24 with a piston 25 slidably positioned internally thereof and in electrical engagement with both the conductor 16 and the interior wall of the cylinder 24. The piston 25 is connected by rods 26 and 27 to a disc 28 which is slidably supported upon the conductor 16 and is used manually to adjust the position of the piston 25 within the cylinder 24 to tune the cavity resonator thus provided. A pick-up loop 29 extends through an aperture 30 of the disc 22 into the path of wave-signal propagation along the conductor 16 and is coupled by conductors 31 to a suitable detector, not shown. One or more resistors 32, 32 are connected between the conductor 16 and the apertured edge of the disc 22 to terminate the conductor 16, operating as an open wave guide, in its image impedance. The resonant wave shield 12, the effectiveness of which is to be measured, or the lengths of the shield members 13, 13 which are to be adjusted, is positioned on the conductor 16 intermediate the discs 18 and 22.

Figure 4:
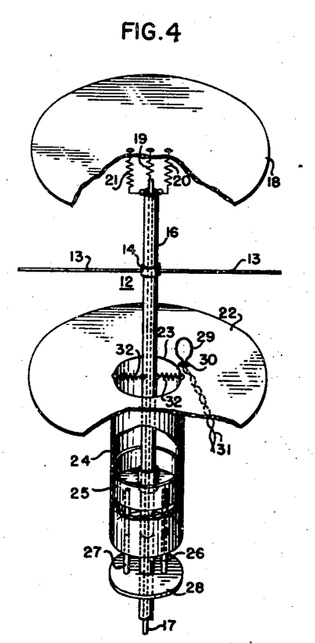
Fig. 4 illustrates a suitable wave-signal apparatus for investigating the properties of the resonant wave-signal shield of the invention.

Considering briefly the operation of the Fig. 4 arrangement, wave-signal energy is applied through the transmission line comprising the conductors 16 and 17 from a wave-signal generator, not shown, to the disc 18. The latter causes wave-signal energy to be propagated along the conductor 16 toward the disc 22, the conductor 16 operating as an open wave guide. The resonant wave shield 12, however, attenuates such wave-signal propagation and the measure of its effectiveness in this regard is determined by the magnitude of the wave-signal energy which passes beyond the resonant wave-signal shield to the disc 22 to induce a voltage in the pick-up loop 29. Where the optimum lengths of the members 13, 13 of the resonant shield 12 are to be ascertained, the members preferably have a telescopic construction so that their lengths may be readily adjusted until the wave-signal shield presents maximum attenuation to wave-signal propagation along the conductor 16. This occurs, as previously explained, when the members have a length equal to an odd number of quarter-wave lengths plus an incremental length sufficient to cancel the mutual inductance between the portions of the conductor 16 on each side of the resonant wave shield 12.

Figure 5:
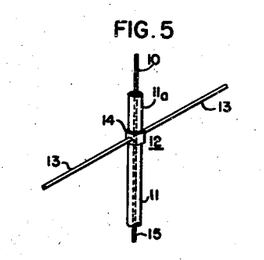
Figs. 5 and 6 illustrate antennas embodying modified forms of the invention.

Fig. 5 represents a modified form of an antenna essentially similar to Fig. 1, similar circuit elements being designated by similar reference numerals, except that the resonant wave-signal shield 12 is positioned sufficiently far from the end of the conductor 11 that the antenna has a desired value of radiation resistance. The end portion 11a of the conductor 11 absorbs wave-signal energy translated by the antenna conductor 10, thus to decrease the antenna radiation resistance. The portion 11a must consequently be considered a part of the wave-signal radiator, notwithstanding that it is an integral portion of the conductor 11, so that the sum of the lengths of the antenna conductor 10, the conductor portion 11a, and the incremental lengths of the shield members 13 must equal an odd number of quater-wave lengths when the antenna is properly resonated. The operation of the resonant wave-signal shield 12 is essentially similar to that hereinbefore described in connection with Fig. 1 in that the shield members 13 provide, adjacent the conductor portion 11a, a path of low impedance to space and the incremental length of the shield members neutralize or cancel the inductive coupling between the antenna conductor 10 and the conductor portion 11a on the one hand and the exposed conductor 11 on the other.

Another method of adjusting the antenna radiation resistance to a desired value is by adjustment of the obtuse angle existing between each of the shield members and the antenna conductor. This principle is employed in the antenna arrangement of Fig. 6, which is essentially similar to that of Fig. 1 and in which similar circuit elements are designated by similar reference numerals and analogous circuit elements by similar reference numerals primed. The shield members 13 extend radially of the antenna conductor 10 as before. However, the obtuse angle $\theta$ between each of the shield members and the antenna conductor 10 is increased from the 90-degree relationship shown in Fig. 1, where the antenna has a radiation resistance of approximately 70 ohms, to some larger value which provides any desired lower value of radiation resistance to a limiting minimum value of approximately 20 ohms. For some applications, it will be more desirable to use the radiation-resistance adjustment method of Fig. 5 in preference to that of Fig. 6 since, for optimum lengths of the shield members 13, the effectiveness of the resonant wave-signal shield 12' is somewhat reduced with increasing values of the angle θ.

Figure 7:
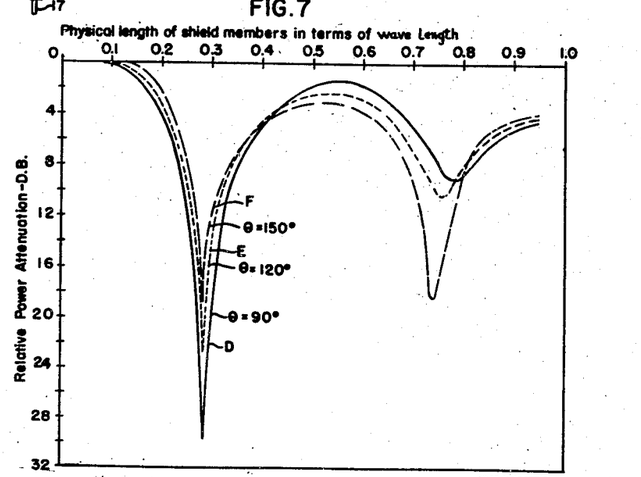
Fig. 7 is a graph representing the effectiveness of the resonant wave-signal shield structure of the Fig. 6 form of the invention with variations of the obtuse angle which the conductive members thereof form with the antenna conductor.

This is made evident by the curves of Fig. 7 which show the relative attenuation provided by the shield 12' for three values of θ. Largest attenuation is effected when the angle θ has the value 90 degrees, as shown by curve D. The attenuation is somewhat less when θ has the value 120 degrees, as shown by curve E, and is still less when θ has the value 150 degrees, as shown by curve F. It will be noted from Fig. 7 that the optimum length of the shield members 13 does not substantially change over this angular range of adjustment of the shield members. The radiation resistance of the antenna varies from approximately 70 ohms when the shield members 13 are normal to the antenna conductor 10, as previously mentioned, to a value of approximately 20 ohms when the shield members have an angle of 150 degrees with relation to the antenna conductor.

Figure 8:
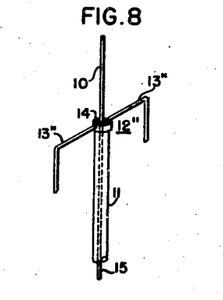
Figs. 8 to 14, inclusive, illustrate antennas embodying additionally modified forms of the invention.

The radiation resistance of the antenna may also be adjusted by bending down the outer ends of the shield members 13 as in the arrangement of Fig. 8 wherein similar circuit elements are designated by similar reference numerals and analogous elements by similar reference numerals double primed. The optimum lengths of the shield members 13" remain substantially constant, but the radiation resistance decreases with increasing lengths of the turned-down portions. In this connection, it may be noted that for any given length of turned-down portion, the value of the radiation resistance also varies somewhat with the angle between the axis of the turned-down portion and an axis normal to the antenna conductor 10.

Figure 9:
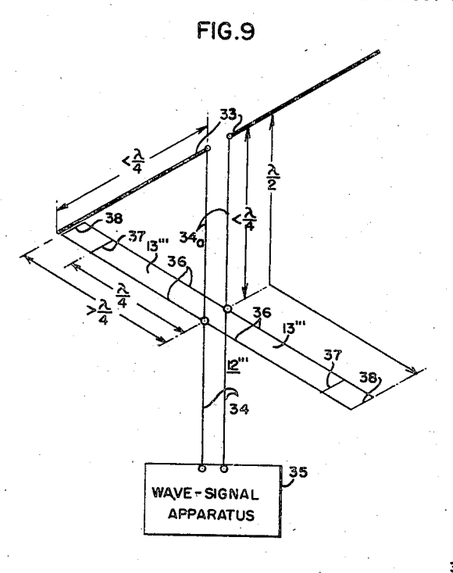

Fig. 9 represents an antenna embodying the present invention in a particular form. Here a half-wave dipole antenna 33 is coupled by an open-pair transmission line 34 to a wave-signal translating apparatus 35 which may be a wave-signal transmitter or receiver. The resonant wave-signal shield 12''' includes two radially extending shield members 13''', each comprising an open-pair transmission line 36 connected at the lower end of a portion 34a of the transmission line 34. A shorting bar 37 is positioned on each transmission line 36 one-quarter wave length from its input end. Each transmission line 36 extends an incremental length beyond the shorting bar 37 to a second shorting bar 38. As in the case of the shield members 13 of the Fig. 1 arrangement, the shield members 13''' of the present arrangement have a length equal to an odd number of quarter-wave lengths plus an incremental length sufficient to cancel the mutual inductance between the transmission-line portion 34a and the transmission line 34. The transmission-line portion 34a has a length such that the sum of its length and that of either shield member 13''' is one-half wave length.

Considering now the operation of the antenna just described, the length of either shield member 13''' to the first shortening bar 37 causes the shield member to present high impedance to balanced wave-signal currents translated between the wave-signal apparatus and the antenna 33. However, any unbalanced wave-signal currents which originate in the wave-signal apparatus 35 or in the antenna 33 by virtue of some unbalanced characteristic thereof, or which are induced in the transmission line 34 by local electrical interference external to the wave-signal system, do not progress in either direction past the resonant wave-signal shield 12'''. This is because the incremental lengths of the shield members cancel the mutual coupling, normally existing for unbalanced currents, between the transmission-line portion 34a and the transmission line 34 and additionally provide at the ends of the incremental lengths paths of low impedance to space for such unbalanced currents as hereinbefore explained in connection with Fig. 1. The resonant wave-signal shield 12''' has the important characteristic, therefore, that it readily permits the translation between the antenna 33 and the wave-signal apparatus 35 of balanced wave signals but presents high attenuation to undesired unbalanced wave signals which may appear on the transmission line 34 or the transmission-line portion 34a. It will be noted that the shield members 13''' extend radially or normal to the antenna 33 and thus have minimum effect on the directive characteristic of the latter.

Figure 10:
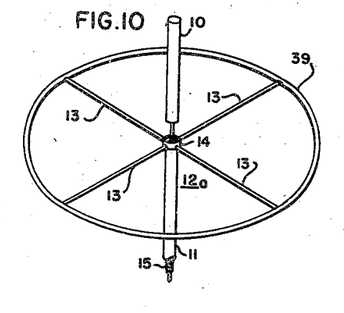

The wave-signal antenna of Fig. 10 is essentially similar to that of Fig. 1, similar elements being designated by similar reference numerals and analogous elements by the same reference numerals with a subscript, except that the resonant wave-signal shield 12a includes four shield members 13 and has a conductive wheel member 39 electrically connecting the outer ends of the shield members substantially to increase the effective electrical lengths thereof. The portion of the wheel member 39 adjacent to the end of each shield member has substantial capacitance to space and thus effectively provides substantial lumped capacitance at that point. The effect of this is that the electrical lengths of the shield members 13 may be made an odd number of quarter-wave lengths plus the required incremental length and yet the actual physical lengths of the shield members 13 may be greatly reduced by the use of the wheel member 39. To this end, the wheel member should be constructed of material having cross-sectional dimensions not substantially less than those of the material from which the shield members 13 are formed.

Figure 11:
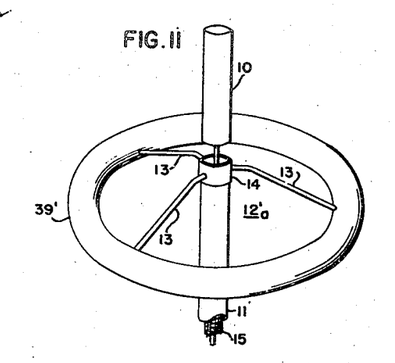

The physical lengths of the shield members 13 may be shortened even more by the use of a wheel member formed of a material having cross-sectional dimensions substantially larger than those of the material of the shield members. An antenna embodying a construction of this nature is illustrated in Fig. 11, which is essentially similar to the antenna of Fig. 10, except that the wheel member 39' of the present antenna has large cross-sectional dimensions thus to provide at the ends of the shield members lumped capacitances substantially larger than in the arrangement of Fig. 10. Only three shield members 13 are employed in the present antenna as an aid in further reducing the physical lengths of these members, this slight reduction of length being in accordance with the statements hereinbefore made in connection with Fig. 3. It may be noted that advantage is taken in the present antenna of so selecting the diameter of the wheel 39' that the shield members 13 form an obtuse angle with relation to the antenna conductor 10 such as to provide a desired value of radiation resistance, thus utilizing the feature of the Fig. 6 antenna arrangement.

Figure 12:
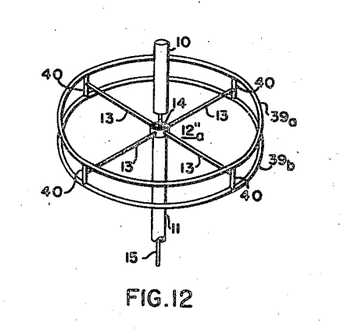
Figure 13A:
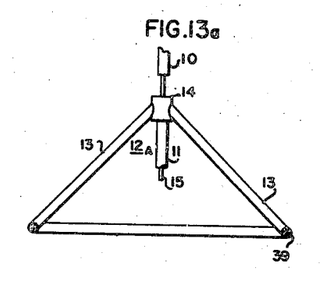
Figure 13B:
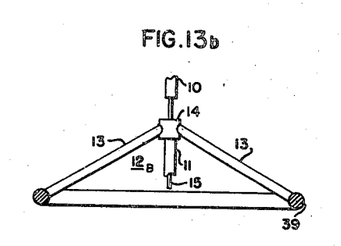
Figure 13C:
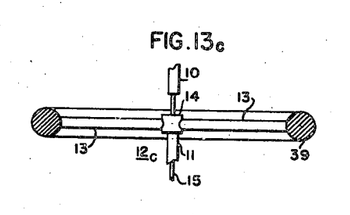
Figure 13D:
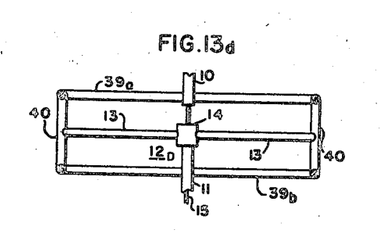
Figure 14A:
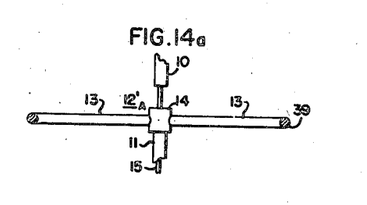
Figure 14B:
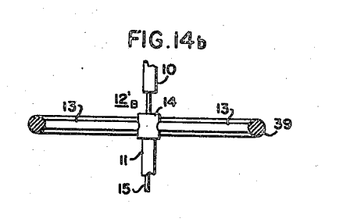
Figure 14C:
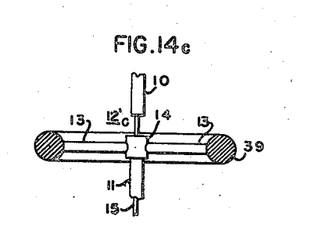
Figure 14D:
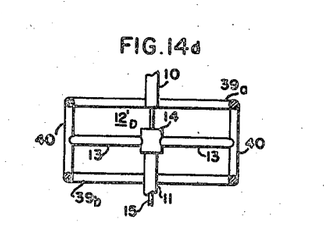

Fig. 12 illustrates an antenna construction essentially similar to that of Fig. 10, similar elements being designated by similar reference numerals, except that the effect of a wheel of large cross-sectional dimensions is attained in the present arrangement by the use of two wheel members 39a and 39b having the same cross-sectional dimensions as those of the shield members. These wheel members are mechanically and electrically connected as a unitary construction by pedestal members 40 which are connected at their centers to the ends of individual ones of the shield members 13. The operating characteristics provided by this construction are much the same as though a wheel of large cross-sectional dimensions had been employed as in the arrangement of Fig. 11 previously described.

The manner in which the effective electrical lengths of the shielding members 13 and the diameter of the wheel may be maintained constant while varying the actual physical lengths of the shielding members is illustrated by Figs. 13a–13d, inclusive. The physical lengths of the shielding members progressively decrease from Fig. 13a to Fig. 13c and, for the purpose of maintaining the same effective electrical lengths of the shielding members, the cross-sectional dimensions of the wheel member 39 become progressively larger. The antennas of Figs. 13c and 13d have equivalent operating characteristics, as explained in connection with Fig. 12. To ascertain in practice the exact cross-sectional dimensions which the wheel member should have for any given physical length of shielding member, the equipment of Fig. 4 may be used. The most convenient procedure in such case is to construct several shielding structures having the given lengths of shielding members but having wheels of progressively larger cross-sectional dimensions. The measured attenuation effected by each such resonant wave-shield structure is then plotted and the optimum cross-sectional dimensions of a wheel providing maximum attenuation to wave-signal propagation may then quickly and readily be ascertained.

Figure 6:
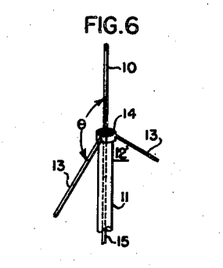

As previously pointed out in connection with Figs. 6 and 11, the radiation resistance of the antenna changes with the obtuse angle which the shielding members make with the antenna conductor 10. Consequently, in designing an antenna of the wheel type embodying the present invention and having a predetermined size and radiation resistance, the following logical procedure briefly outlined may be employed: first, the optimum lengths of shielding members alone is ascertained by the use of the Fig. 4 equipment; secondly, the obtuse angle which the shielding members must make with the antenna conductor to provide the desired value of radiation resistance is ascertained by conventional methods of measuring radiation resistance; and, thirdly, the optimum cross-sectional dimensions of the wheel member for any given physical length of the shielding members is ascertained again by the use of the Fig. 4 equipment.

Figs. 14a–14d, inclusive, illustrate the manner in which the diameter of the wheel member may be varied while maintaining constant both the radiation resistance of the antenna and the effective electrical lengths of the shielding members. The physical lengths of the shielding members 13 is progressively shortened from Fig. 14a to Fig. 14d and it will be seen that the effective cross-sectional dimensions of the wheel member 39 must progressively increase. The principles of design and the method of procedure employed in constructing an antenna in this case is much the same as explained in connection with Figs. 13a–13d, inclusive, and will not be repeated.

Figure 15:
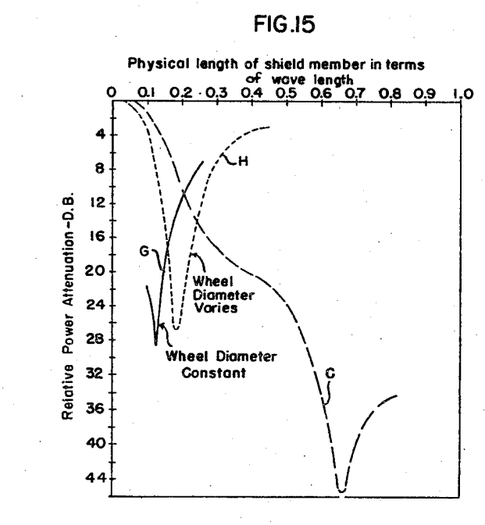
Fig. 15 is a graph representing the effectiveness of the wave-signal shield of specified ones of the last-mentioned antennas with variation of specified shield parameters.

Fig. 15 is a graph representing the effectiveness of a resonant wave-signal shield of the wheel type with variations of certain shield parameters. The data for curve G was taken for a wave-signal shield having a wheel of constant diameter and relatively large constant cross-sectional dimensions, much like the wheel of Fig. 13c, but having varying lengths of shield members 13. The optimum physical length of the shield members for a wheel of this diameter and cross section is seen from curve G to be 0.125 wave length. Curve H in similar manner shows the effectiveness of the resonant wave-signal shield when both the physical length of the shield members and the diameter of the wheel vary, but with the cross-sectional dimensions of the wheel held constant and equal to those of the shield members. The shield members in this case should have physical lengths of 0.19 wave length. Curve C corresponds to the same curve of Fig. 3 and is here given for purposes of comparison with the prior art type of solid conductive shielding disc.

Figure 16:
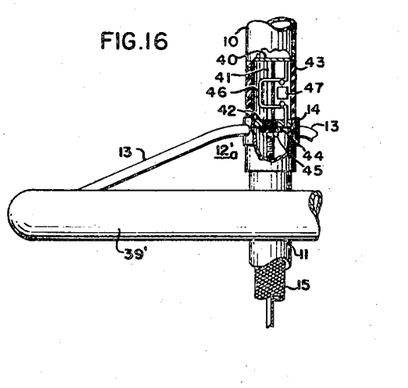
Fig. 16 illustrates certain constructional details of an antenna embodying the invention.

The antenna conductor and the resonant wave-signal shield are preferably maintained in assembled relation as a unitary structure as illustrated by Fig. 16. Additionally, this structure may have provision made for securing it at the end of an exposed rigid mast, for example a length of pipe. An additional feature of the Fig. 16 construction concerns the use of a shunt-tuned circuit connected between the lower end of the antenna conductor and the wave-signal shield for purposes of maintaining the antenna impedance substantially constant over a predetermined relatively narrow range of wave lengths. The fragmentary portion of the antenna here shown corresponds to the Fig. 11 type of antenna and similar elements are designated by similar reference numerals. The antenna conductor 10 is formed of tubular material and has its lower end closed by a conductive disc 40 to the center of which is secured, as by brazing or the like, a conductive rod 41. The latter extends through an aperture provided in a conductive disc 42 which is electrically and mechanically connected to the elongated stepped collar 14. A cylinder 43 of insulating material is positioned between the antenna conductor 10 and the disc 42. An insulating bushing 44 insulates the rod 41 from the conductive disc 42. The lower end of the rod 41 is threaded and a nut 45 is threaded thereon to maintain the antenna conductor 10, the insulators 43 and 44, and the resonant wave-signal shield 12'a in assembled relation. The lower end of the collar 14 is threaded to receive the upper end of the conductive mast 11. The upper end of the cable 15 preferably terminates in a socket adapted to receive the lower end of the rod 41 when this unitary antenna assembly is threaded on to the mast 11.

The present antenna includes means resonant at a predetermined wave length in a relatively narrow range of wave lengths over which the antenna is to operate, and connected between the antenna conductor 10 and the resonant wave-signal shield 12'a, for maintaining substantially constant the radiation resistance of the antenna over the required wave length range. This means comprises a shunt-tuned circuit including an inductor 46 and a capacitor 47 resonant at the aforementioned predetermined wave length. One end of this shunt-tuned circuit is connected to the disc 40 of the antenna conductor 10 while the other end is connected to the disc 42 of the resonant wave-signal shield 12'a.

Figure 17:
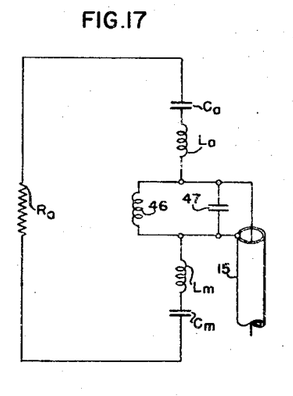
Fig. 17 represents the equivalent circuit diagram of an antenna embodying the Fig. 16 construction.
Figure 18:
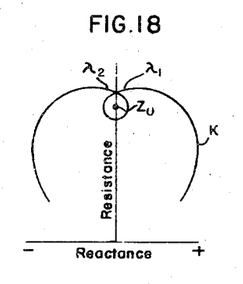
Fig. 18 is a graph representing the impedance characteristics of an antenna embodying the last-mentioned construction.

The operation of the resonant shunt-tuned circuit 46, 47 will be considered with reference to Fig. 17, which represents the equivalent circuit diagram of the antenna, and Fig. 18 which represents the radiation resistance characteristic of the antenna. The circuit symbols employed in Fig. 17 correspond to those of Fig. 2. It will be seen that the antenna conductor and the resonant wave-signal shield essentially comprise a first circuit series resonant at the mean operating wave length and that this circuit is effectively connected across the shunt-tuned circuit 46, 47 resonant at the same mean wave length. As explained in United States Letters Patent No. 2,064,774, granted December 15, 1936, to Harold A. Wheeler for Wave signal collecting system, and in United States Letters Patent No. 2,196,881, granted April 9, 1940, to Harold A. Wheeler for Tunable selector of uniform band width, both assigned to the same assignee as the present application, the circuit arrangement here employed essentially comprises a band-pass selector having a substantially uniform wave-signal translation characteristic over a predetermined range of wave lengths. This causes the antenna to have a substantially uniform impedance over such range of wave lengths. The impedance characteristic of an antenna having a shunt-tuned circuit arranged in this manner is shown by curve K of Fig. 18. As there indicated, the impedance of the antenna at any wave length $\lambda$ may have a reactive and a resistive component. The coaxial transmission line 15 which is connected to the antenna has a surge or characteristic impedance which is resistive and is plotted on the axis of ordinates in Fig. 18 as $Z_0$. Curve K represents the impedance of the antenna as seen by the coaxial transmission line. It will be seen from curve K that the antenna impedance, which is primarily only a component of radiation resistance, is substantially constant from a first wave length $\lambda_1$ to a second wave length $\lambda_2$ and that, over this range, the impedance of the antenna is substantially equal to the image impedance of the coaxial transmission line. This insures maximum transfer of power between the transmission line and the antenna over the wave length range $\lambda_1$ to $\lambda_2$.

From the above description of the invention, it will be apparent that an antenna embodying the invention has a high degree of freedom from the effect of exposed conductors which terminate at the antenna and extend therefrom. Such an antenna also has the advantage that its radiation resistance may be easily and readily fixed by design or adjustment to any desired value within a relatively wide range of such values and one which, when so fixed, is substantially constant over a relatively wide range of operating wave lengths. There is the further advantage that an antenna embodying the invention is adapted to be constructed as a unitary structure having an effective wave-signal shield of small physical dimensions and of relatively light weight.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

2. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor and each having an effective electrical length of an odd number of quarter-wave lengths plus an incremental length at the mean wave length of said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

3. In a system for translating wave signals within a predetermined relatively narrow range of wave lengths, an antenna comprising, a linear antenna conductor adapted to be supported for operation at the end of a nearby exposed colinear conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

4. In a system for translating wave signals within a predetermined relatively narrow range of wave lengths, an antenna comprising, an antenna conductor having an effective electrical length less than one-fourth wave length at a predetermined wave length in said range and adapted to be supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor and each having an effective electrical length of an odd number of quarter-wave lengths plus an incremental length at said predetermined wave length, the incremental lengths of said members having such values as to provide substantially optimum cancellation of the inductive coupling between said conductors within said predetermined range and the sum of the length of said antenna conductor and of the incremental length of any of said members being substantially equal to a quarter-wave length at said predetermined wave length, thereby to provide an antenna having a resonant wave-signal shield which substantially reduces the undesirable guiding of energy by said nearby conductor away from said antenna conductor within said predetermined range.

5. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor and each having an effective electrical length of an odd number of quarter-wave lengths plus an incremental length at a predetermined wave length in said range, the incremental lengths of said members having a value not exceeding one-eighth of said predetermined wave length and selected to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

6. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive rods each extending radially from said antenna conductor and each having an effective electrical length of an odd number of quarter-wave lengths plus an incremental length at a predetermined wave length in said range, the incremental lengths of said rods having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

7. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of tubular conductive members each extending radially from said antenna conductor and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

8. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor at a predetermined angle relative thereto and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range and the angle of said members relative to said antenna conductor having such value as to provide a desired radiation resistance for said antenna conductor, thereby to provide an antenna having a predetermined desired radiation resistance and a resonant wave-signal shield which substantially reduces the undesirable guiding of energy by said nearby conductor away from said antenna conductor within said predetermined range.

9. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor and normal thereto and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

10. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each extending radially from said antenna conductor at an obtuse angle relative thereto and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

11. In a system for translating wave signals within a predetermined relatively narrow range of wave lengths, an antenna comprising, an antenna conductor supported for operation at the end of a nearby exposed conductor and extending therefrom, whereby said nearby conductor may desirably guide energy away from said antenna conductor, and a unitary electrically conductive structure positioned in the adjacent space between said conductors and conductively connected with said exposed conductor, said structure including a plurality of conductive members each extending radially from said antenna conductor and having at a predetermined wave length in said range a physical length substantially less than an odd number of quarter-wave lengths and each having lumped capacitive means in open space electrically connected thereto at the outer end so to increase the effective electrical length of each said member that it has an effective electrical length of said odd number of quarter-wave lengths plus an incremental length, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

12. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive spoke members each extending radially from said antenna conductor and a conductive wheel member electrically connecting the outer ends of said members to increase the effective electrical lengths thereof to an odd number of quarter-wave lengths plus an incremental length at a predetermined wave length in said range, the incremental lengths of said spoke members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

13. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each formed of a material having predetermined cross-sectional dimensions and extending radially from said antenna conductor and a conductive wheel member electrically connecting the outer ends of said members and formed of a material having cross-sectional dimensions at least equal to those of said members for increasing the effective electrical lengths thereof to an odd number of quarter-wave lengths plus an incremental length at a predetermined wave length in said range, the incremental lengths of said conductive members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

14. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each formed of a material having predetermined cross-sectional dimensions and extending radially from said antenna conductor and a conductive wheel member electrically connecting the outer ends of said members and so constructed as to have effective cross-sectional dimensions substantially larger than corresponding dimensions of said conductive members substantially to increase the effective electrical lengths thereof to an odd number of quarter-wave lengths plus an incremental length at a predetermined wave length in said range, the incremental lengths of said conductive members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

15. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, and a unitary electrically conductive structure positioned in the adjacent space between said conductors and conductively connected with said exposed conductor, said structure including a plurality of conductive members each formed of a material having predetermined cross-sectional dimensions and extending radially from said antenna conductor and a conductive wheel member electrically connecting the outer ends of said members and formed of a material having cross-sectional dimensions substantially larger than those of said members for substantially increasing the effective electrical lengths thereof to an odd number of quarter-wave lengths plus an incremental length at a predetermined wave length in said range, the incremental lengths of said conductive members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range.

16. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, a unitary electrically conductive structure positioned in the adjacent space between said conductors and conductively connected with said exposed conductor, said structure including a plurality of conductive members each extending radially from said antenna conductor and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range, and means resonant at said predetermined wave length and connected between said antenna conductor and said structure for maintaining substantially constant the radiation resistance of said antenna over said range.

17. In a system for translating wave signals within a predetermined relatively narrow range of wave lengths, an antenna comprising, an antenna conductor supported for operation at the end of a nearby exposed conductor and extending therefrom, whereby said nearby conductor may undesirably guide energy away from said antenna conductor, a unitary electrically conductive structure positioned in the adjacent space between said conductors and conductively connected with said exposed conductor, said structure including a plurality of conductive members each extending radially from said antenna conductor and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range, thereby to provide an antenna having a resonant wave-signal shield which substantially reduces the undesirable guiding of energy by said nearby conductor away from said antenna conductor within said predetermined range, and a shunt-tuned circuit including an inductor and capacitor resonant at said predetermined wave length and connected between said antenna conductor and said structure for maintaining substantially constant the radiation resistance of said antenna over said range.

18. A resonant wave-signal shield for substantially shielding against the propagation between two exposed conductors of wave signals having any wave length within a predetermined relatively narrow range of wave lengths comprising, a unitary electrically conductive structure having means for supporting said structure in the adjacent space between said conductors in conductive connection with one thereof and including a plurality of conductive members each extending radially from the other of said conductors and each having an effective electrical length of an odd number of quarter-wave lengths plus an incremental length at a predetermined wave length in said range, the incremental lengths of said members having such values as to provide substantially optimum cancellation of the inductive coupling between said conductors within said predetermined range.

19. A resonant wave-signal shield for substantially shielding against the propagation between two exposed conductors of wave signals having any wave length within a predetermined relatively narrow range of wave lengths comprising, a unitary electrically conductive structure having means for supporting said structure in the adjacent space between said conductors in conductive relation with one thereof and including a plurality of conductive members each extending radially from the other of said conductors and lumped capacitive means in open space electrically connected to said members at the outer ends thereof so to increase the effective electrical lengths thereof that each said member has an effective electrical length of an odd number of quarter wave lengths plus an incremental length, the incremental lengths of said members having such values as to provide substantially optimum cancellation of the inductive coupling between said conductors within said predetermined range.

20. A resonant wave-signal shield for substantially shielding against the propagation between two exposed conductors of wave signals having any wave length within a predetermined relatively narrow range of wave lengths comprising, a unitary electrically conductive structure having means for supporting said structure in the adjacent space between said conductors in conductive connection with one thereof and including a plurality of conductive members each extending radially from the other of said conductors and a conductive wheel member electrically connecting the outer ends of said members substantially to increase the effective electrical lengths thereof to an odd number of quarter wave lengths plus an incremental length at a predetermined wave length in said range, the incremental lengths of said members having such values as to provide substantially optimum cancellation of the inductive coupling between said conductors within said predetermined range.

21. A resonant wave-signal shield for substantially shielding against the propagation between two exposed conductors of wave signals having any wave length within a predetermined relatively narrow range of wave lengths comprising, a unitary electrically conductive structure having means for supporting said structure in the adjacent space between said conductors in conductive connection with one thereof and including a plurality of conductive members each formed of a material having predetermined cross-sectional dimensions and extending radially from one of said conductors, said structure additionally including a conductive wheel member formed of a material having cross-sectional dimensions at least equal to that of said conductive members for electrically connecting the outer ends thereof to increase the effective electrical lengths of said members to an odd number of quarter wave lengths plus an incremental length at a predetermined wave length in said range, the incremental lengths of said members having such values as to provide substantially optimum cancellation of the inductive coupling between said conductors within said predetermined range.

22. A resonant wave-signal shield for substantially shielding against the propagation between two exposed conductors of wave signals having any wave length within a predetermined relatively narrow range of wave lengths comprising, a unitary electrically conductive structure having means for supporting said structure in the adjacent space between said conductors in conductive connection with one thereof and including a plurality of conductive members each formed of a material having predetermined cross-sectional dimensions and extending radially from the other of said conductors, said structure additionally including a conductive wheel member electrically connecting the outer ends of said conductive members and so constructed as to have effective cross-sectional dimensions substantially larger than corresponding dimensions of said conductive members substantially to increase the effective electrical lengths of said conductive members to an odd number of quarter-wave lengths plus an incremental length at a predetermined wave length in said range, the incremental lengths of said members having such values as to provide substantially optimum cancellation of the inductive coupling between said conductors within said predetermined range.

23. A resonant wave-signal shield for substantially shielding against the propagation between two exposed conductors of wave signals having any wave length within a predetermined relatively narrow range of wave lengths comprising, a unitary electrically conductive structure having means for supporting said structure in the adjacent space between said conductors in conductive connection with one thereof and including a plurality of conductive members each formed of a material having predetermined cross-sectional dimensions and extending radially from the other of said conductors, said structure additionally including a conductive wheel member electrically connecting the outer ends of said conductive members and formed of a material having cross-sectional dimensions substantially larger than those of said conductive members for substantially increasing the effective electrical length thereof to an odd number of quarter wave lengths plus an incremental length at a predetermined wave length in said range, the incremental lengths of said members having such values as to provide substantially optimum cancellation of the inductive coupling between said conductors within said predetermined range.

HAROLD A. WHEELER.

REFERENCES CITED

The following references are of record in the file of this patent:

UNITED STATES PATENTS

| Number | Name | Date |
|---|---|---|
| 2,275,342 | Brown | Mar. 3, 1942 |
| 2,149,415 | Berndt | Mar. 7, 1939 |
| 2,026,652 | Ponte | Jan. 7, 1936 |
| 2,234,333 | Brown | Mar. 11, 1941 |

FOREIGN PATENTS

| Number | Country | Date |
|---|---|---|
| 536,823 | Great Britain | May 28, 1941 |